Nov. 15, 1927.
W. F. HEROLD
1,649,528
CASTER
Filed Nov. 3, 1926
2 Sheets-Sheet 1
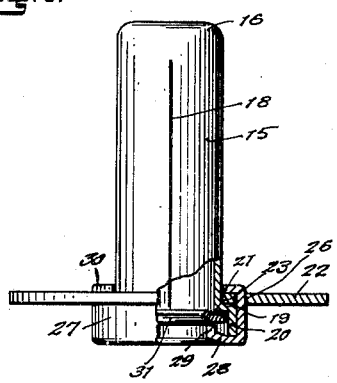
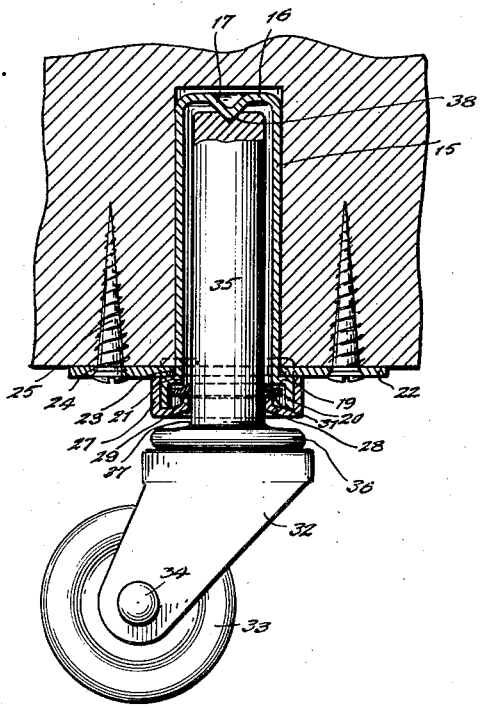
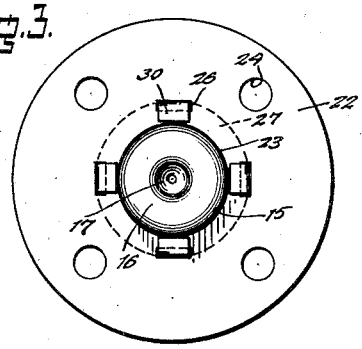
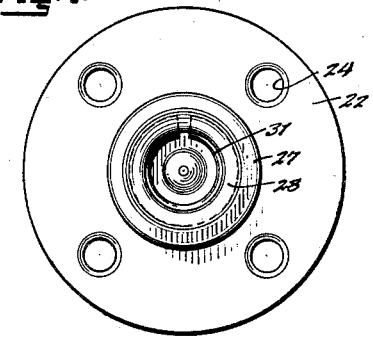
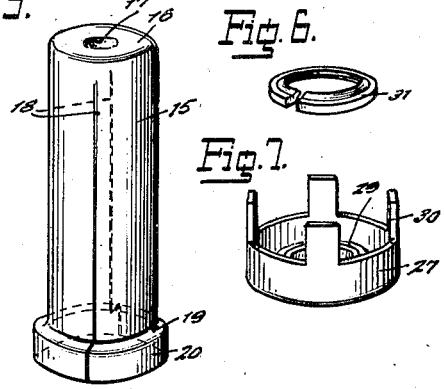
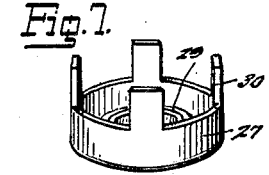
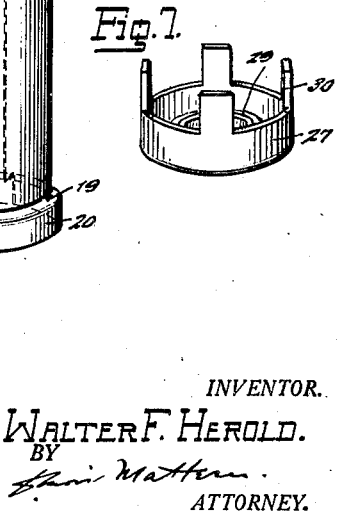
INVENTOR.
Walter F. Herold.
BY
ATTORNEY.

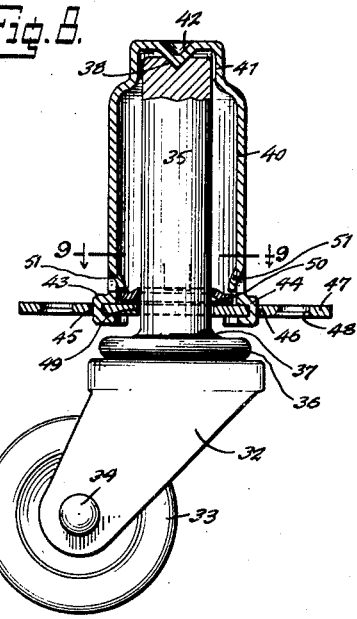
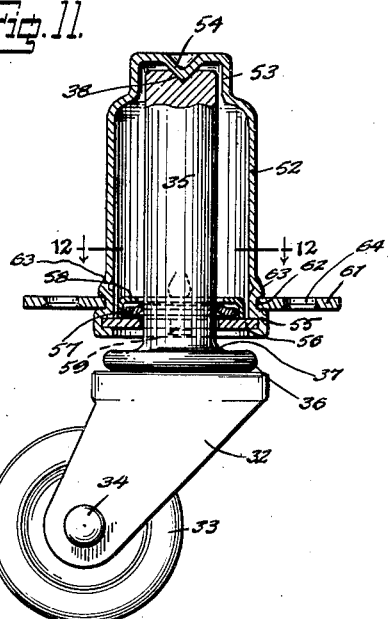
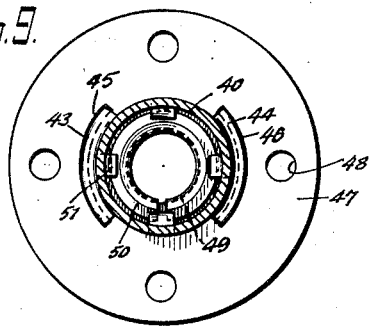
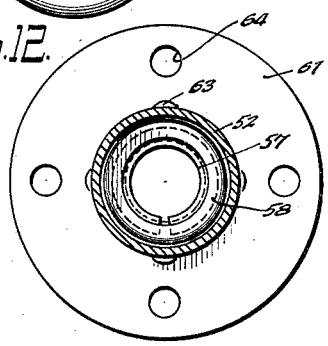
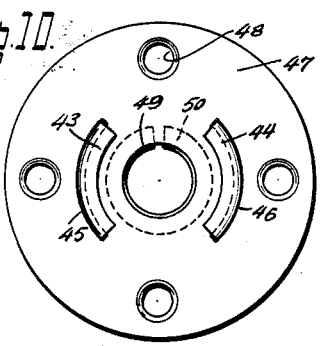
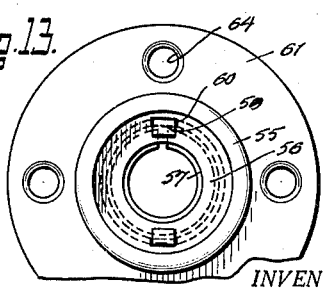

Patented Nov. 15, 1927.

1,649,528

UNITED STATES PATENT OFFICE.

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT.

CASTER.

Application filed November 3, 1926. Serial No. 145,955.

The present invention relates to improvements in casters, adapted for use particularly with heavy articles of furniture, as pianos, and the like, and has for an object to provide a socket formed of sheet metal in which holding means is provided to cooperate with the pintle independently of the pintle receiving socket shell portion, so that the latter may be of any desired size, or form, without respect to the pintle shape or diameter.

Another object is to provide a socket in which the pintle holding means is adapted to grip upon the surface of the pintle, and with which a substantially plain pintle, free of grooves, or enlargements, may be employed, and which will have no tendency to retard the swiveling of the caster; and further, to provide such means which at no time is called upon to carry any stress due to side motion or side strain, so that the holding means is practically free of wear or deterioration.

A further object is to provide a socket including a relatively large diameter furniture leg engaging bearing plate, and to so combine such plate with the socket structure as to provide a strong, reliable and efficient construction. In particular, it is proposed to provide a socket and bearing plate assembly in which the load strain will be transmitted to the bearing plate, without danger of distortion or separation of the parts.

It is also an object to provide a reinforced socket structure which may be directly engaged with the floor, to act as a slide, and also hammered to a considerable extent, without any danger or distorting the socket structure, either above or below the base plate, the structure furthermore being such that the strain from direct engagement of the socket with the floor, hammer blows, or the like, is taken up in the bearing plate, with practically no strain on the socket and furniture leg.

With the above and other objects in view, embodiments of the invention are shown in the accompanying drawings, and these embodiments will be hereinafter more fully described with reference thereto, and the invention will be finally pointed out in the claims.

In the drawings:—

Fig. 1 is a side elevation, partly in section, of a caster socket, according to one embodiment of the invention;

Fig. 2 is a vertical sectional view thereof, inserted in the furniture leg, and with the caster mounted therein, the socket being turned 45° from the position shown in Fig. 1;

Fig. 3 is a top plan view of the socket;

Fig. 4 is a bottom plan view thereof;

Fig. 5 is a perspective view of the socket shell member employed;

Fig. 6 is a perspective view of the spring ring employed;

Fig. 7 is a perspective view of the base member employed;

Fig. 8 is a vertical sectional view of a modified form of socket member, with the caster inserted therein;

Fig. 9 is a horizontal sectional plan view thereof, taken along the line 9—9 of Fig. 8;

Fig. 10 is a bottom plan view of the same;

Fig. 11 is a vertical sectional view of a further modified form of socket member, with the caster inserted therein;

Fig. 12 is a horizontal sectional plan view thereof, taken along the line 12—12 of Fig. 11; and Fig. 13 is a bottom plan view of the same.

Similar reference characters indicate corresponding parts throughout the several figures of the drawings.

Referring to the drawings, the socket, according to the embodiment of the invention shown in Figs. 1 to 7, comprises a tubular socket shell member 15, formed from flat sheet metal stock folded upon itself, and providing a top portion 16 including a top center pintle bearing 17 in the form of an inverted cone-shaped indenture, the longitudinal meeting edges of the blank providing longitudinal seams 18 at opposed sides of the socket member. At the base of the socket member there is provided an annular outwardly bent shoulder 19 and an annular downwardly bent flange 20, the annular under surface of the shoulder being filleted, as at 21, to provide a spring ring retaining seat, as will be hereinafter more fully pointed out.

The bearing plate or disc 22, preferably formed of heavier gauge metal than the socket member, is of relatively large diameter and is provided with a central opening 23 through which the socket member is engaged, so that the plate seats upon the flange 19, as clearly indicated in Fig. 1. A number of openings 24 are provided in the plate for securing the socket to the furniture by means of screws 25, and in line with the outer periphery of the flange 20 there are provided a number (four as shown) of slots 26, these slots being preferably disposed intermediate the radial lines of the openings 24.

The base member 27, cupped up from sheet metal stock, is provided with an inwardly bent bottom pintle bearing flange 29, the flange 28 being beveled inwardly from its point of contact with the flange 20. At the upper edge of the base there are formed spaced upwardly projecting lugs 30 adapted, as shown in Figs. 1 and 2, to be inserted through the slots 26 of the bearing plate and bent inwardly upon the upper surface thereof, to thereby secure the socket member, base member, and bearing plate in rigidly connected relation, with the flange 19 of the socket member and the upper edge of the base member bearing upon the under surface of the bearing plate.

The split spring ring 31 is preferably of the type disclosed and claimed, per se, in my co-pending application Serial Number 120,672, filed July 6, 1926, being formed of sheet metal and having a cylindrical outer periphery and a beveled flanged inner periphery, the latter having the three-fold function of imparting the necessary springiness or tension to the sheet metal, providing an upper seating surface to engage the filleted seat 21 of the socket, and providing a beveled lead surface for guiding the pintle into the socket, without any chance of jamming the ring or pulling it out of its recess. The cylindrical outer periphery and the flat upper and lower adjacent surfaces insure a positive positioning of the ring in relation to the shoulder 19 and flange 20. The inner diameter of the ring in its normal or unsprung relation is smaller than that of the bottom bearing flange 29, and its outer diameter is smaller than the inner diameter of the flange 20. The annular space between the flanges 20 and 29 is less than the lateral thickness of the ring, so that the latter will not lodge in this space upon being shifted laterally against the flange 20, while the beveled surface of the ring is so dimensioned that upon such shifting movement the flat under surface of the ring will not be exposed within the pintle receiving opening of the flange 29, and any possibility of jamming through engagement with such flat surface is prevented.

The detachable caster consists of the usual horn 32 having a caster wheel 33 rotatably carried therein upon an axle 34, and having a pintle 35 secured in its upper transverse portion, the lower end of the pintle being provided with a flange 36 engaging the upper surface of the horn, a rounded fillet surface 37 being formed between the flange and the cylindrical pintle surface. At the upper end of the pintle there is provided a cone-shaped recess 38 adapted to engage the top center bearing 17. The diameter of the pintle is such that its lower portion will expand the ring 31 and be thus held thereby against dropping out of the socket, the ring being snugly held about the pintle and freely rotatable within the recess formed between the socket and base members.

In the operative or engaged position of the caster, as shown in Fig. 2, the pintle has thrust bearing upon the center top bearing 17, being held vertically by the substantial bottom bearing provided by the flange 29, and the load strain between the furniture and the pintle is imposed directly upon the bearing plate 22 and transmitted to the pintle through the relatively wide reinforced flange 19 of the socket member. The spring ring firmly retains the caster against dropping out, but its relation is such that there is no tendency to frictionally resist or retard the swiveling action of the caster.

The flanged structure of the socket and base members, and their connection with the bearing plate, provides a very strong rigid construction, adapted to withstand heavy side strains, and is sufficiently reinforced, so that, before insertion of the caster pintle, it may be directly engaged with the floor surface, and moved about as a sliding support to a considerable extent, without danger of crumpling or distortion, the reinforcement provided by the flange 20 providing a strong rigid support, while the beveling of the flange 28 inwardly of the flange 20 relieves the flange 29 of any pressure, so that there is no danger of forcing it into binding contact with the spring ring. The flange 20 being directly beneath the wide bearing plate 22 imposes the load strain on the latter, and through its large bearing surface is enabled to withstand very considerable weight and side strain without danger of splitting the furniture or loosening or distorting the relation of the socket therewith. Also, this structure is such that it may be hammered into place with relatively heavy hammer blows, without danger of distortion, or binding the spring ring, the hammer blows being directed upon the base at the annular portion directly below the flange 20, which latter takes the force of the blows, the flange 29 being protected by the beveling of the flange 28.

In Figs. 8 to 10 I have illustrated a modification, in which the cylindrical pintle receiving shell 40 is of larger diameter than that disclosed in Figs. 1 to 7, and is provided with an annularly shouldered reduced top 41 having an inverted cone-shaped top center pintle bearing 42. At its lower end there are provided outwardly flanged diametrically opposed arcuate flanges 43 and 44 bent downwardly and engaged through arcuate slots 45 and 46 in the bearing plate or disc 47, being bent inwardly upon the under side of the plate to rigidly secure it to the socket member. Spaced screw holes 48 are provided in the plate near its outer periphery, and the central opening 49 is of a diameter to receive the caster pintle 35 and constitute a bottom side thrust bearing therefor.

The pintle retaining split spring ring 50 is disposed in concentric relation to the opening 49 upon the upper surface of the bearing plate within the socket member, and is loosely retained by means of a series of lugs 51 struck from the wall of the socket member and bent inwardly into retaining relation with said ring.

In Figs. 11 to 13 there is illustrated a further modification, comprising a cylindrical relatively large diameter socket shell 52 provided with an annularly shouldered reduced top portion 53 having an inverted cone-shaped top center pintle bearing 54. At its lower end the socket is provided with an annularly grooved flanged base 55 formed by bending outwardly to form an annular shoulder and downwardly and inwardly to form an internal annular groove within which is secured a centrally apertured bottom pintle bearing base plate 56. The pintle retaining split spring ring 57 is disposed upon the upper side of the base plate 56 in concentric relation to its opening, and is retained by means of an apertured cup-shaped member 58 secured to the base plate by means of lugs 59 inserted downwardly through slots 60 in the base plate and bent over upon the under side thereof. The large diameter bearing plate 61 is centrally apertured, as at 62, and is engaged over the socket shell, and is secured against the annular shoulder formed by the flange 55 by means of a series of bosses 63 pressed out from the wall of the socket shell and abutting the upper surface of the bearing plate. Screw holes 64 are provided in the bearing plate for screwing the same to the furniture.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:—

1. In a socket for casters, or the like, a leg engaging element having a spring retaining pocket at its lower end, a spring ring loosely disposed in said pocket, and a bearing plate secured to and extending laterally outwardly from said leg supporting element.

2. In a socket for casters, or the like, a tubular leg engaging element having a flange at its lower end, a bearing plate secured in relation to said flange and extending laterally outwardly from said leg engaging element, and a pintle retaining spring ring loosely disposed in proximity to the lower end of said leg engaging element.

3. In a socket for casters, or the like, a tubular leg engaging element having a flange at its lower end, a base member engaged with said flange and providing therewith a spring retaining pocket, spring means disposed in said pocket, a bearing plate engaging said flange and extending laterally outwardly therefrom, and connection means between said base member and said plate adapted to secure said base member, plate, and leg engaging element in rigidly connected relation.

4. In a socket for casters, or the like, a tubular leg engaging element having a flange at its lower end, a base member engaged with said flange and providing therewith a spring retaining pocket, spring means disposed in said pocket, a bearing plate engaging said flange and extending laterally outwardly therefrom and provided with slots, and lugs on said base member engaged in said slots and bent over on said bearing plate to secure said base member, plate, and leg engaging element in rigidly connected relation.

5. In a socket for casters, or the like, a tubular leg engaging element having an outwardly bent shoulder and a downwardly bent flange at its lower end, a cup-shaped centrally apertured base member engaged about said downwardly bent flange and spaced by said flange with relation to said shoulder to provide an annular spring retaining pocket, spring means disposed in said pocket, a bearing plate engaging said shoulder and extending laterally outwardly therefrom, and connection means between said base member and said plate adapted to secure said base member, plate, and leg engaging element in rigidly connected relation.

6. In a socket for casters, or the like, a tubular leg engaging element having an outwardly bent shoulder and a downwardly bent flange at its lower end, a cup-shaped centrally apertured base member engaged about said downwardly bent flange and spaced by said flange with relation to said shoulder to provide an annular spring retaining pocket, spring means disposed in said pocket, a bearing plate engaging said flange and extending laterally outwardly therefrom, and integral lug portions carried by said base member and bent into relation with said bearing plate adapted to secure said base member, plate, and leg engaging element in rigidly connected relation.

7. In a socket for casters, or the like, a tubular leg engaging element having an outwardly bent shoulder at its lower end, a centrally apertured base member having an upwardly bent pintle bearing flange and providing with said shoulder an annular spring retaining pocket, spring means disposed in said pocket, a bearing plate engaging said outwardly bent flange and extending laterally outwardly therefrom, and connection means between said base member and said plate adapted to secure said base member, plate, and leg engaging element in rigidly connected relation.

8. In a socket for casters, or the like, a leg engaging element, a base member engaged therewith and providing with said element a spring retaining pocket, means adapted to reinforce said pocket axially, a spring ring disposed in said pocket, said base including an annular impact portion in axial register with said reinforcing means and a pocket forming portion disposed inwardly of the plane of said impact portion, a bearing plate disposed laterally outwardly from said leg engaging element, and connection means between said base member and said plate adapted to secure said base member, plate, and leg engaging element in rigidly connected relation.

Signed at Bridgeport, in the county of Fairfield, and State of Connecticut, this 22nd day of October, 1926.

WALTER F. HEROLD.